Figure 1:
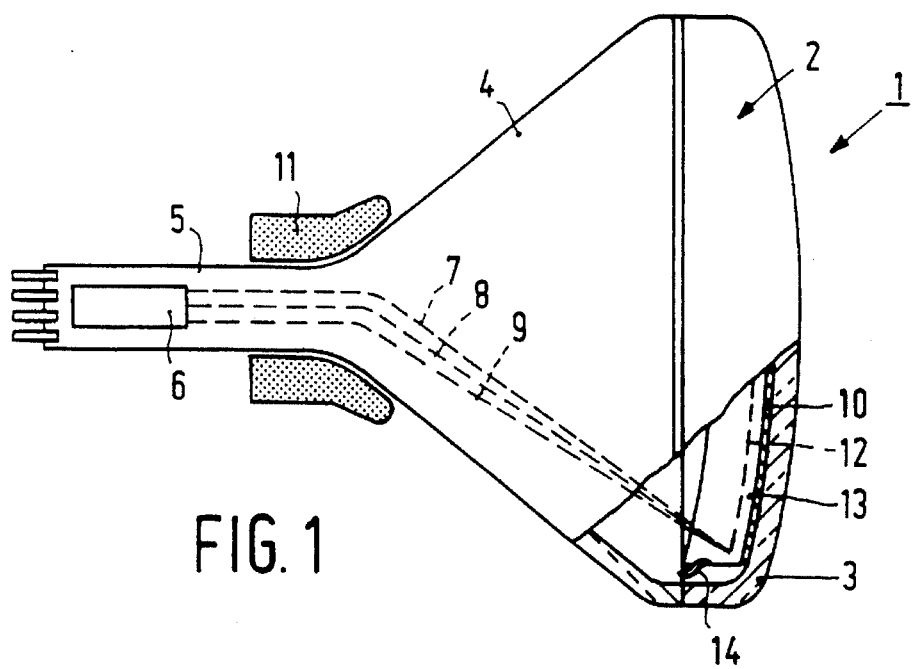

United States Patent [19]

Van Hout

[11] Patent Number: 5,536,997

[45] Date of Patent: Jul. 16, 1996

[54] CATHODE RAY TUBE

[75] Inventor: Leonardus Th. M. Van Hout, Eindhoven, Netherlands

[73] Assignee: U.S. Philips Corporation, New York, N.Y.

[21] Appl. No.: 870,020

[22] Filed: Apr. 17, 1992

[30]  Foreign Application Priority Data

May 8, 1991 [EP] European Pat. Off. .............. 91201103

[51] Int. Cl.⁶ ...................................................... H01J 31/08
[52] U.S. Cl. .............................................................. 313/479
[58] Field of Search ............................................... 313/479

[56] References Cited

U.S. PATENT DOCUMENTS

| | | | |
|---|---|---|---|
| 4,124,540 | 11/1978 | Foreman et al. ................... | 313/479 X |
| 4,163,919 | 8/1979 | Speigel ................................. | 313/479 |
| 4,374,344 | 2/1983 | Misono et al. ...................... | 313/479 |

FOREIGN PATENT DOCUMENTS 406503  1/1991  European Pat. Off. .............. 313/479

OTHER PUBLICATIONS

"Materials and Techniques for Electron Tubes" by W. H. Kohl, Reinhold Publishing Co., N.Y., N.Y., (1962) pp. 60, 155.

*Primary Examiner*—Sandra L. O'Shea
*Attorney, Agent, or Firm*—John C. Fox

[57]  ABSTRACT

A cathode ray tube in which a glass-enamel layer having particles with a secondary electron emission coefficient smaller than 1, for example $Cr_2O_3$ particles, is provided in the neck. The percentage of particles exceeds approximately 30% and the surface resistance or resistivity ranges between $10^{10}$ and $10^{14}$ $\Omega/\square$. The high-voltage behavior of such a layer is satisfactory. The convergence drift is relatively small. In addition, a description is given of a method of providing such a glass-enamel layer.

10 Claims, 2 Drawing Sheets

5,536,997

CATHODE RAY TUBE

The invention relates to a cathode ray tube comprising an evacuated envelope having a glass neck portion and a cone portion, an electron gun being arranged in the neck portion.

Cathode ray tubes are used in, inter alia, colour television receivers and colour monitors.

BACKGROUND OF THE INVENTION

A problem which occurs in cathode ray tubes is that after switching on the device surfaces in the vicinity of the electron gun are charged. Negative effects thereof are, inter alia, flashover and, in the case of multibeam cathode ray tubes, a dependence on time of the convergence of the beams. As a result of which time-dependence, the relative positions of the electron beams on the display screen change after switching on the multi-beam cathode ray tube. The latter phenomenon is also termed convergence drift. It is an object of the invention to provide a cathode ray tube of the type mentioned in the opening paragraph, in which the above problem does not occur or only to a small degree.

SUMMARY OF THE INVENTION

To this end, the cathode ray tube according to the invention is characterized in that a glass-enamel layer is provided on the inside of the neck portion, which glass-enamel layer contains particles of a substance having a secondary emission coefficient smaller than 1, the weight percentage of the particles being higher than approximately 30% and the surface resistance of the glass-enamel layer ranging between approximately $10^{10}$ and $10^{14}$ $\Omega/\square$.

If the percentage is below approximately 30%, considerable charging of the layer takes place which results inter alia in a substantial convergence drift, for example, in multibeam cathode ray tubes. A surface resistance in excess of $10^{14}$ $\Omega/\square$ increases the convergence drift; a surface resistance below $10^{10}$ $\Omega/\square$ increases the risk of flashover.

Preferably, the weight percentage does not exceed approximately 60%. Higher percentages by weight lead to a reduced bonding of the glass-enamel layer to the neck, which may result in the presence of loose particles and/or the glass-enamel layer becoming detached. Loose particles may cause flashover.

In an embodiment the glass-enamel layer contains $Cr_2O_3$.

In another embodiment, a conductive layer is provided on the inside of the cone portion of the cathode ray tube and the glass-enamel layer electrically contacts the conductive layer.

In a further embodiment in which the electron gun comprises contact springs for contacting the conductive layer, the glass-enamel layer covers the conductive layer to at least beyond the contact springs.

It has been found that the risk of flashover at high voltages is reduced when the glass-enamel layer extends to beyond the contact springs. The so-called high-voltage behaviour has improved.

The invention also relates to a method of manufacturing a cathode ray tube, in which method a suspension of glass-enamel particles and particles of a material having a secondary emission coefficient which is smaller than 1 is provided on the inside of the neck, after which a glass-enamel layer is formed by melting the glass-enamel particles. This is a simple method of providing a suitable glass-enamel layer on the inside of the neck.

BRIEF DESCRIPTION OF THE DRAWING FIGURES

Figure 3:
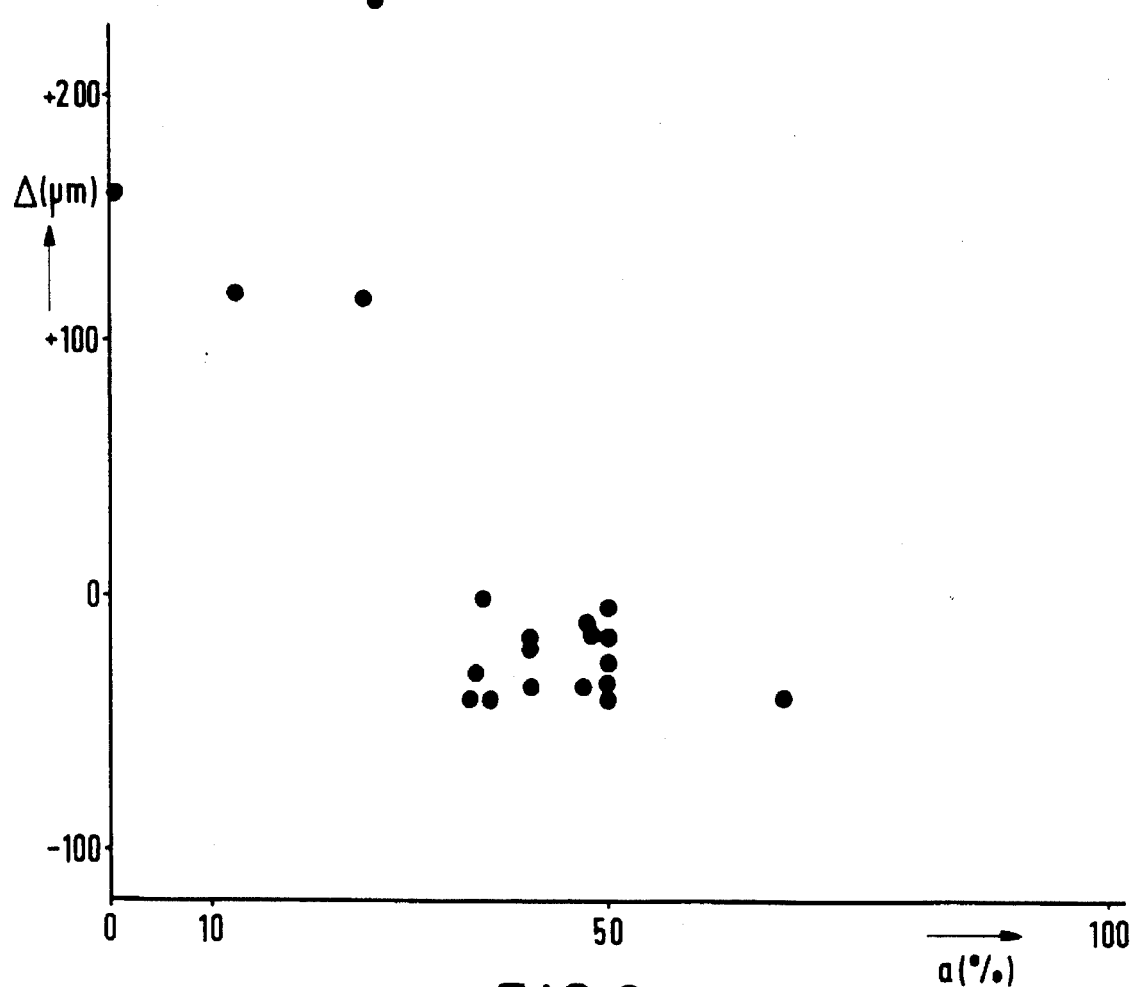
Figure 2:
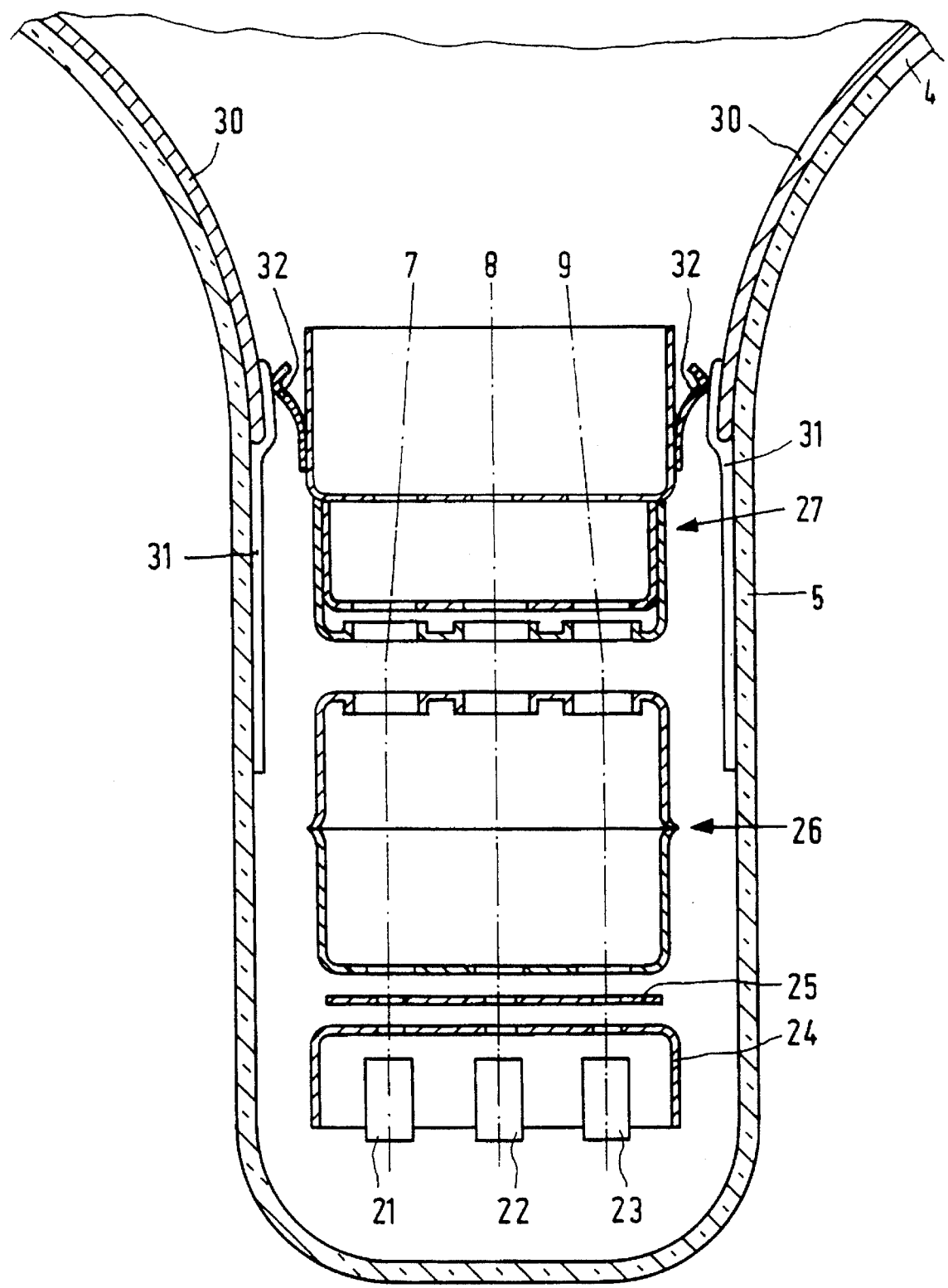

The invention will be explained in greater detail by means of a few exemplary embodiments and with reference to the accompanying drawing, in which FIG. 1 is a sectional view of a cathode ray tube;

FIG. 2 is a sectional view of a detail of a cathode ray tube according to the invention in which a glass-enamel layer is provided on the inside of the neck and on a part of the conductive layer on the inside of the cone; and FIG. 3 graphically shows the convergence drift as a function of the composition of the glass-enamel layer.

The Figures are not drawn to scale. Corresponding parts generally bear the same reference numerals in each of the Figures.

DESCRIPTION OF THE INVENTION

A cathode ray tube, in this example colour display tube 1, comprises an evacuated envelope 2 which is composed of a display window 3, a cone portion 4 and a neck 5. In the neck 5 there is provided an electron gun 6 for generating three electron beams 7, 8 and 9 which extend in one plane, the in-line plane which in this case is the plane of the drawing. A display screen 10 is provided on the inside of the display window. The display screen 10 comprises a large number of phosphor elements luminescing in red, green and blue. On their way to the display screen 10 the electron beams 7, 8 and 9 are deflected across the display screen 10 by means of deflection unit 11 and pass through a colour selection electrode 12 which is arranged in front of the display window 3 and which comprises a thin plate with apertures 13. The three electron beams 7, 8 and 9 pass through the apertures 13 of the colour selection electrode at a small angle with each other and, consequently, each electron beam impinges on phosphor elements of only one colour. In this example, the colour selection electrode 12 is suspended by suspension means 14.

FIG. 2 is a sectional view of a neck portion of a cathode ray tube according to the invention. The electron gun is arranged in the neck portion. In this example, the electron gun comprises cathodes 21, 22 and 23 and a number of electrodes 24, 25, 26 and 27, a main lens being formed between the electrodes 26 and 27. A conductive layer 30 is provided on the cone portion 4. A glass-enamel layer 31 is provided on the inside of the neck portion 5. The glass-enamel layer comprises particles of a material having a secondary emission coefficient which is smaller than 1. The surface resistance of layer 31 ranges between $10^{10}$ and $10^{14}$ $\Omega/\square$. The layer 31 has a surface resistance, or resistivity, such that, on the one hand, the conduction is sufficiently high to preclude excessive charging of the glass-enamel layer and, on the other hand, not so high that only a very small voltage drop takes place across the glass-enamel layer. Preferably, the glass-enamel layer electrically contacts the conductive layer 30. By virtue thereof, an electric charge can be dissipated in a simple manner. Preferably, the glass-enamel layer extends at least in an area in the vicinity of the main lens. Flashover and convergence drift occur in particular in the area near the main lens. The electron gun comprises contact springs 32. The glass-enamel layer 31 extends to beyond the contact springs. It has been found that this has a favourable effect on the high-voltage behaviour.

A problem which occurs in multibeam cathode ray tubes is the so-called convergence drift. After switching on the multibeam cathode ray tube, the outermost electron beams move relative to the central electron beam. After a while a stable level is attained.

FIG. 3 graphically shows the convergence drift (Δ), after stabilization and in μm, as a function of the percentage of $Cr_2O_3$ (α) of the glass layer. The grain size of the $Cr_2O_3$ particles used ranges between, for example, 0.5 μm and, for example, 10 μm. $Cr_2O_3$ is a material having a secondary emission coefficient below 1. For a material having a secondary emission coefficient smaller than 1 it holds that for each electron which is incident on the substance, such as $Cr_2O_3$ less than 1 secondary electron is created. As a result thereof the substance becomes negatively charged. The secondary emission coefficient is governed by the energy of the primary electron and exhibits a maximum. A material having a secondary emission coefficient smaller than 1 is to be understood to mean within the scope of the invention a material having a maximum secondary emission coefficient smaller than 1.

A convergence drift of x μm means that after stabilization the distance between the outermost electron beams and the central electron beam has decreased by x μm relative to the situation immediately after switching on the cathode ray tube. For a value of approximately 30% a considerable change in the convergence drift takes place, as shown in FIG. 3. For percentages in excess of approximately 30% the convergence drift is approximately −30 μm, for percentages smaller than approximately 30% the convergence drift is approximately 160 μm, i.e. approximately 5–6 times greater and of opposite sign. A negative convergence drift is probably caused by a negatively charged glass-enamel layer. Consequently, in the glass-enamel layer for a cathode ray tube according to the invention the percentage of particles having a secondary electron-emission coefficient is selected so that the glass-enamel layer becomes preferably negatively charged. In apparent contradiction thereto, however, measurements show that for weight percentages of $Cr_2O_3$ smaller than approximately 70% the maximum secondary emission coefficient of the glass-enamel layer is greater than 1. An explanation for this apparent contradiction or for the fact that the convergence drift exhibits a step change as a function of the weight percentage of $Cr_2O_3$ (although the secondary emission coefficient itself does not exhibit a step change) still remains to be found. Investigations have shown that for glass-enamel layers having a relatively high convergence drift, the particles having a secondary electron emission coefficient smaller than 1, in this example $Cr_2O_3$, are completely embedded in the glass so that the free surface of the glass-enamel layer has a smooth appearance. For layers according to the invention which have a relatively low convergence drift, the free surface is studded with projecting $Cr_2O_3$ particles which are only partly embedded in the glass-enamel layer.

Preferably, the above-mentioned weight percentage is less than 60%. Higher percentages result in a reduced bonding of the glass-enamel layer to the neck and to the conductive layer (if present). Due to this, loose particles may be present or the glass layer may become detached from the neck. Loose particles may cause flashover in the electron gun. A detached glass-enamel layer does not suppress or hardly suppresses the convergence.

Preferably, the glass-enamel layer contains a type of glass having a low melting point. Customarily, the cone and the display window are interconnected by frit sealing at a temperature of approximately 450° C. The glass of the glass-enamel layer preferably has a melting temperature which is approximately equal to the then existing temperature so that the glass-enamel layer and the frit seal can be manufactured simultaneously. This saves time. Other types of glass can also be used, provided that the melting temperature is lower than the melting temperature of the glass of the neck.

In the example, the glass of the glass enamel layer contains a lead-borate type of glass having a melting point of approximately 450° C. A lead-borate glass consists largely of lead oxide (PbO) and boron oxide ($B_2O_3$). Such glass layers provide a satisfactory bonding. A particularly good bonding is obtained if the glass of the neck portion is a lead-containing type of glass. The lead-borate glass may comprise additives to improve the melting or bonding properties, for example zinc oxide (ZnO). An example of the composition of a usable type of glass is:

approximately 80% of lead oxide
approximately 16% of boron oxide
approximately 4% of zinc oxide,
the values are indicated in weight percentages.

The invention also relates to a method of manufacturing a cathode ray tube, in which in a process step a glass layer comprising a substance having a secondary emission coefficient smaller than 1 is provided on the inside of the neck. A suspension is made of glass enamel and particles of a substance having a secondary emission coefficient smaller than 1, for example a suspension of a lead-borate glass enamel and $Cr_2O_3$ particles in a weight ratio of 1:1 in an alcohol, for example 2-propanol. A layer of the suspension is provided on the inside of the neck. The suspension is dried. Subsequently, a glass-enamel layer containing the above particles is formed by heating to a temperature at which the glass enamel melts.

This is a simple method of providing a bonding glass layer on the inside of the neck of the cathode ray tube. Tests have been carried out with, inter alia, suspensions of $CrO_3$ and a glass enamel comprising 80% of lead oxide, 16% of boron oxide and 4% of zinc oxide.

It will be obvious that within the scope of the invention variations are possible to those skilled in the art. Examples of the variations are:

Besides a substance having a secondary emission coefficient smaller than 1 the glass-enamel layer may contain additional substances. In a test, inter alia, the influence of adding MgO having a very high secondary emission coefficient has been investigated. For glass-enamel layers having a composition of glass:$Cr_2O_3$:MgO in the ratios 4:3:1 (a), 4:2:2 (b), 4:1:3 (c) the following convergence drifts have been measured: −30 μm (a), +120 μm (b) and +120 μm (c), respectively. These measuring results correspond to the measuring results shown in FIG. 3.

I claim:

1. In a cathode ray tube comprising an evacuated envelope having a glass neck portion and a cone portion, and an electron gun being arranged in said neck portion, wherein the improvement comprises a glass-enamel layer provided on the inside of the neck portion, said glass-enamel layer containing particles of a substance having a secondary emission coefficient smaller than 1, the weight percentage of said particles being higher than approximately 30% and the surface resistivity of the glass-enamel layer ranging between approximately $10^{10}$ and $10^{14}$ Ω/□.

2. A cathode ray tube as claimed in claim 1, characterized in that said weight percentage does not exceed approximately 60%.

3. A cathode ray tube as claimed in claim 2, characterized in that the glass-enamel layer contains $Cr_2O_3$ particles.

4. A cathode ray tube as claimed in claim 3, characterized in that a conductive layer is provided on the inside of the cone portion of the cathode ray tube and the glass-enamel layer electrically contacts said conductive layer.

5. A cathode ray tube as claimed in claim 4, characterized in that the electron gun comprises contact springs for contacting the conductive layer through the glass enamel layer, the glass-enamel layer covering the conductive layer at least beyond the contact springs.

6. A cathode ray tube as claimed in claim 1, characterized in that the glass-enamel layer contains $Cr_2O_3$ particles.

7. A cathode ray tube as claimed in claim 2, characterized in that a conductive layer is provided on the inside of the cone portion of the cathode ray tube and the glass-enamel layer electrically contacts said conductive layer.

8. A cathode ray tube as claimed in claim 7, characterized in that the electron gun comprises contact springs for contacting the conductive layer through the glass enamel layer, the glass-enamel layer covering the conductive layer at least beyond the contact springs.

9. A cathode ray tube as claimed in claim 1, characterized in that a conductive layer is provided on the inside of the cone portion of the cathode ray tube and the glass-enamel layer electrically contacts said conductive layer.

10. A cathode ray tube as claimed in claim 9, characterized in that the electron gun comprises contact springs for contacting the conductive layer through the glass enamel layer, the glass-enamel layer covering the conductive layer at least beyond the contact springs.

* * * * *